United States Patent [19]

Haendle et al.

[11] Patent Number: 4,663,773
[45] Date of Patent: May 5, 1987

[54] X-RAY DIAGNOSTIC INSTALLATION WITH SUBTRACTION STAGE

[75] Inventors: Joerg Haendle, Erlangen; Werner Haas, Uttenreuth, both of Fed. Rep. of Germany

[73] Assignee: Siemens Aktiengesellschaft, Berlin and Munich, Fed. Rep. of Germany

[21] Appl. No.: 697,444

[22] Filed: Feb. 1, 1985

[30] Foreign Application Priority Data

Mar. 12, 1984 [DE] Fed. Rep. of Germany ....... 3409009
Jul. 20, 1984 [DE] Fed. Rep. of Germany ....... 3426830

[51] Int. Cl.⁴ ............................................ H05G 1/64
[52] U.S. Cl. ...................................... 378/99; 358/111
[58] Field of Search ................ 378/99; 358/111, 31, 358/167

[56] References Cited

U.S. PATENT DOCUMENTS

| | | |
|---|---|---|
| 4,064,530 | 12/1977 | Kaiser et al. |
| 4,179,705 | 12/1979 | Faroudja ................ 358/31 |
| 4,398,213 | 8/1983 | Haendle et al. |
| 4,463,375 | 7/1984 | Macovski ............... 378/99 |
| 4,503,459 | 3/1985 | Haendle et al. ........ 358/111 |
| 4,504,908 | 3/1985 | Riederer et al. ....... 358/111 |
| 4,507,681 | 3/1985 | Verhoeven et al. ..... 378/99 |
| 4,536,790 | 8/1985 | Kruger et al. ......... 378/99 |
| 4,544,948 | 10/1985 | Okazaki ............... 378/99 |

FOREIGN PATENT DOCUMENTS 0097044 6/1983 European Pat. Off. .

Primary Examiner—Craig E. Church
Assistant Examiner—John C. Freeman
Attorney, Agent, or Firm—Hill, Van Santen, Steadman & Simpson

[57] ABSTRACT

An x-ray diagnostic installation has a video display system connected to the output of an x-ray image intensifier, the video system including a subtraction stage with a weighting circuit connected to an image memory for suppressing image noise the subtraction stage also having a difference forming element for subtracting image information arising at different times. The output of the difference forming stage is supplied to a threshold circuit and the output of the threshold circuit is read into another image memory picture element-by-picture element. This memory is connected to the weighting circuit such that the output thereof controls the parameters of the weighting circuit picture element-by-picture element. A filter circuit may be interconnected between the output of this memory and the weighting circuit.

9 Claims, 5 Drawing Figures

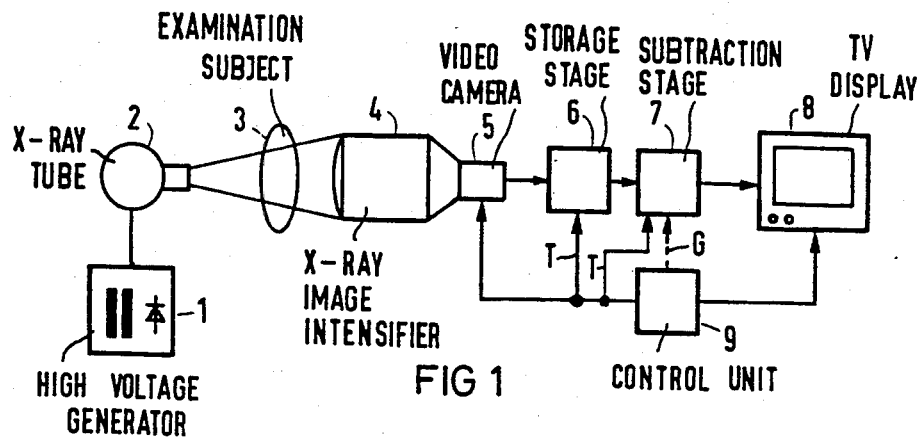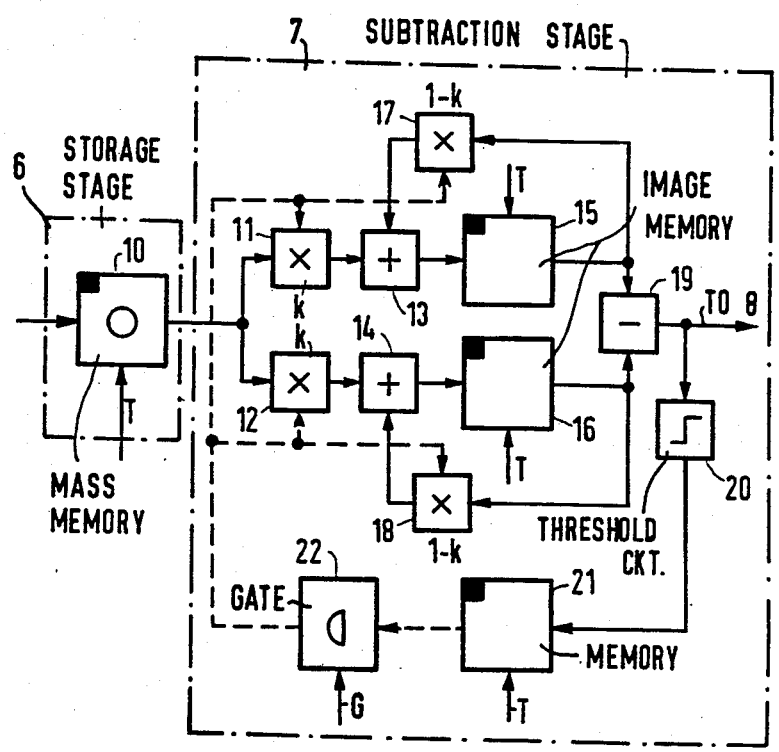

X-RAY DIAGNOSTIC INSTALLATION WITH SUBTRACTION STAGE

BACKGROUND OF THE INVENTION

1. Field of the Invention

The present invention relates to x-ray diagnostic installations, and in particular to x-ray diagnostic installations having a video display chain.

2. Description of the Prior Art

X-ray diagnostic installations wherein the display means, such as a video display system or chain, are known which employ a means for generating subtraction images. Such subtraction images are particularly useful in angiography for highlighting blood vessels which are otherwise difficult to perceive in the normal x-ray picture, or which may be covered by bone structure.

An x-ray diagnostic installation for producing subtraction images is described in U.S. Pat. 4,398,213 wherein a blank image, that is, an image without the presence of a contrast agent, is obtained and averaged over a plurality of scannings, the blank image being stored in a memory. Subsequently the person being examined is injected with a contrast agent. Images generated with contrast agent present are then either directly supplied to a difference forming stage (transillumination subtraction) or are deposited in a further image memory averaged over the same plurality of scannings. Subtraction of the blank image from the contrast agent image is undertaken in the difference forming stage, so that only the vessels filled with contrast agent which are of interest can be subsequently seen on a monitor.

Averaging of the video picture is undertaken for the purpose of reducing the picture noise. A circuit for suppressing picture noise is described in detail in U.S. Pat. No. 4,064,530. In this known system, noise suppression is achieved by weighting the current video signal with a factor (1-a) and weighting a stored video signal with the factor (a). The two weighted video signals are added and are entered into the image memory. Given constant factors, (1-a) and (a), the noise component will be too high if the value of (a) is selected too small, whereas rapid motion sequences cannot be perceived if the value of (a) is selected too large. The system disclosed in U.S. Pat. No. 4,064,530 undertakes a difference formation of successive video signal components in order to recognize movement in the video signal and to correspondingly select the value of (a) low given occurring large motion, and to correspondingly increase the value of (a) given slight motion.

If such a conventional circuit were employed in angiography, the large modification of the video signal which occurs upon the appearance of the contrast agent would erroneously be interpreted by this known circuit as motion, and thus would result in the selection of a low factor (a). Although the chronological progression of the contrast agent could be displayed without delay, the image would be extremely noisy particularly in those portions thereof outside of the blood vessels.

SUMMARY OF THE INVENTION

It is an object of the present invention to provide an x-ray diagnostic installation wherein the chronological progression of the contrast agent is clearly visible on a display unit without delay, and wherein the remaining picture portions exhibit low noise.

The above object is inventively achieved in an x-ray diagnostic installation having a video chain including a subtraction stage, the subtraction stage having a difference forming unit connected to a threshold circuit, the threshold circuit in turn being connected to a memory in which the output of the threshold circuit is entered picture element-by-picture element. The memory is connected to a weighting circuit with the output signal of the memory controlling parameters of the weighting circuit picture element-by-picture element. Different time constants can thus be selected for every picture element, with the allocation of those different time constants to the picture elements being controlled by determining chronological changes within the video signal.

In one embodiment of the invention, the weighting circuit may be constructed in the form of a filter circuit, particularly a recursive filter circuit with controllable time constants. In a further embodiment another filter circuit, such as a spatial frequency filter may be connected between the weighting circuit and the output of the memory, the memory output controlling the filter characteristic of the spatial frequency filter. A simple spatial frequency filter may be utilized consisting of a low-pass filter which is controlled by the output signal of the memory. Further contrast enhancement of the essential picture portions is achieved if a high-pass filter is connected in parallel with a low-pass filter in a further embodiment, with the filters being alternately operated by the memory. The spatial frequency filter may consist of a low-pass filter and a high-pass filter having output signals which are superimposed in an adder stage, with the high-pass filter being operated by the output signal of the memory.

In an x-ray diagnostic installation having a weighting or filter circuit which comprises a multiplication stage connected to the circuit input, and an adder stage having an output connected to an image memory and inputs connected to the output of the multiplication stage and to the output of a further multiplication stage interconnected between the adder stage and the image memory, it is preferable to operate the multiplication stages in a switchable manner and to control the factors of the multiplication stages picture element-by-picture element by means of memory.

DESCRIPTION OF THE DRAWINGS

FIG. 1 is a schematic block diagram of an x-ray diagnostic installation constructed in accordance with the principles of the invention;

FIG. 2 is a detail diagram showing the storage stage and the subtraction stage of the x-ray diagnostic installation of FIG. 1;

DESCRIPTION OF THE PREFERRED EMBODIMENTS

Figure 3:
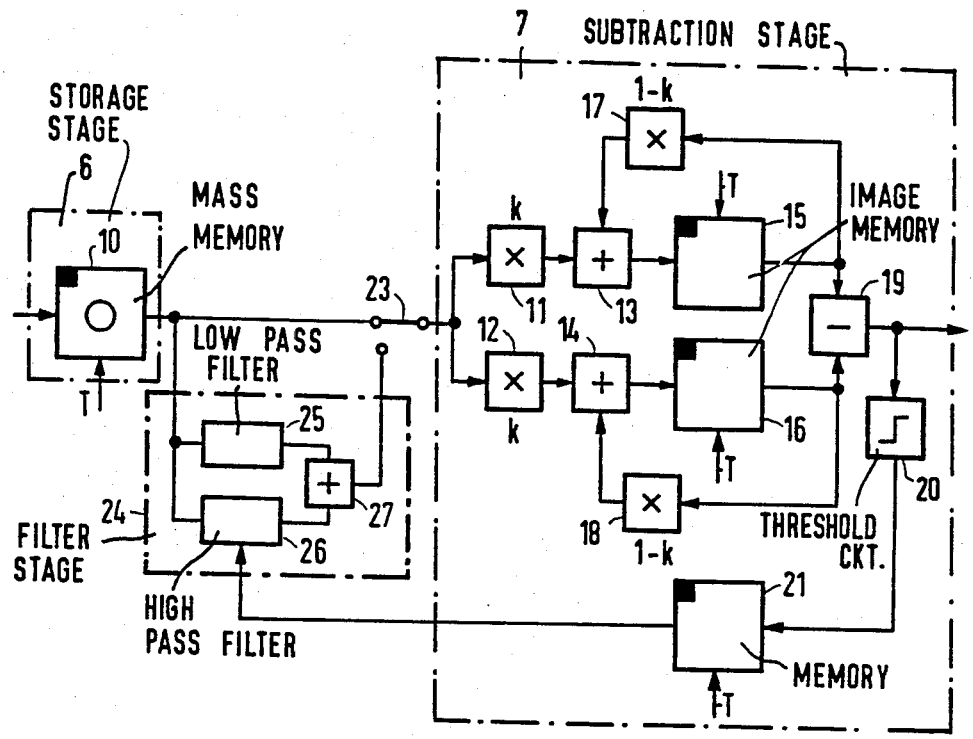
FIG. 3 is a block diagram showing a further embodiment of the storage stage and the subtraction stage with a filter connected therebetween.

An x-ray diagnostic installation constructed in accordance with the principles of the present invention is schematically shown in FIG. 1. The installation includes a high-voltage generator 1 which supplies an x-ray tube 2 for irradiating an examination subject 3. Radiation passing through the examination subject 3 is received on the input screen of an x-ray image intensifier 4, the output screen of the intensifier 4 being coupled to a video camera 5. The video camera 5 is part of a video display chain including a storage stage 6, a subtraction stage 7 and a TV display monitor 8. Control signals are respectively supplied to each of those units by a control unit 9 for synchronizing the chronological operation of the chain.

The video signal from the video camera 5 is supplied to the storage stage 6 in either analog or digital form. As shown in FIG. 2, the storage stage 7 may consist of a mass memory 10 supplied with a control signal T from the control unit 9 for controlling the chronological succession of the entry of data therein.

The subtraction stage 7 includes two multiplication stages 11 and 12 having inputs connected to the output of the storage stage 6. The outputs of the multiplication stages 11 and 12 are respectively connected to adder stages 13 and 14. The outputs of the adder stages 13 and 14 are respectively connected to data inputs of image memories 15 and 16, also supplied with the control signal T from the control unit 9. The outputs of the image memories 15 and 16 are respectively fed back to second inputs of the adders 13 and 14 through respective further multiplication stages 17 and 18. The image memories 15 and 16 each have a storage capacity of one image.

The output signals of the image memories 15 and 16 are also supplied to a difference forming unit 19, the output of which is supplied to the TV display 8. The output of the difference forming unit 19 is also supplied to the input of a threshold circuit 20, having an output connected to a data input of a memory 21, also controlled by the signal T from the control unit 9. The output of the memory 21 is supplied through a gate circuit 22 to the multiplication stages 11, 12, 17 and 18 for controlling the respective multiplication factors thereof. The gate 22 is operated by a control signal G from the control unit 9.

The video signal from the video camera 5 is first entered in the mass memory 10. Either after conclusion of the storage process or during storage, the video signal is supplied to the multiplication stages 11 and 12 wherein the video signal is multiplied by a factor (k) which in this embodiment is much less than one, for example, 1/16. In the adder stages 13 and 14, this video signal is added to the stored signal multiplied by the factor (1−k), the output being entered in the respective image memories 15 and 16. Because in this embodiment the factor (1−k) is larger than the factor (k), only a small component of the current video signal is added to a component of the stored video signal, so that an integration with a large time constant is achieved.

When contrast agent is injected into the examination subject 3, the roll-in operation in the first image memory 15 is interrupted by the control unit 9, so that a blank image averaged over a plurality of video images or scans is stored therein. The current video signal continues to be integrated in the manner described above in the second image memory 16. As a result of the integration of the video signal, at which suppresses image differences due to noise, the output signal of the difference forming stage is substantially zero. Upon the appearance of the contrast agent, a large change occurs in the region of the vessels. The signal embodying this change is permitted to pass picture element-by-picture element by the threshold circuit 20 and is entered into the memory 21. The gate 22 inhibits the output signal of the memory 21 for a period and generates a constant signal which sets the factors (k) to the value identified above.

When injection of the contrast agent has been concluded, the image showing the paths of the vessels to be examined is stored in the memory 21. These stored values are read out through the gate circuit 22, no longer inhibiting the output as a result of a signal from the control unit 9, synchronized with video signal from the mass memory 10. The signal from the memory 21 controls the multiplication factors of the multiplication stages 11, 12, 17 and 18 picture element-by-picture element such that the factor (k) remains small in the region of the image outside of the vessels (as in the preceding case) and the factor (k) is selected higher, for example $\frac{1}{2}$ or 1, within the vessels which have been transmitted by the threshold circuit 20 to the memory 21. Thus integration with a low time constant is achieved inside the vessels and integration with a high time constant is achieved outside the vessels. The image noise outside of the vessels is thus substantially completely suppressed, whereas averaging within the vessels is undertaken over only a few images, in which the noise is lower due to the presence of the contrast agent, so that a low time constant derives and the course of the contrast agent can be traced substantially without delay.

By use of the mass memory 10, the circuit shown in FIG. 2 is particularly suted for post-examination processing of the signals. The circuit can, however, be employed as well for real-time processing if the current video signal is directly supplied to the multiplication stages 11 and 12. If operated in this manner, a low factor (k) is again initially selected, so that the video signal is integrated with a large time constant. When a change in the video signal occurs, this is perceived by the threshold circuit 20 and is entered in the memory 21. At the same time, the factors (k) of the multiplication stages 11, 12, 17 and 18 are switched for the picture elements in which the contrast agent is present, so that integration is again carried out only over a few images in this region. The gate circuit 22 is not required for operation in this manner. For such operation, however, the threshold level of the threshold circuit 20 must be considerably lower than in the previously-described embodiment, because the threshold circuit 20 must be sensitive enough to react to the first rise in the image signal caused by the contrast agent density.

Instead of the threshold 20, a comparator may be utilized for detecting whether a selected rated input value has been exceeded. A signal indicating this value has been exceeded is stored in the memory 21, which need only have a memory capacity of one bit.

The use of a plurality of threshold circuits instead of a single threshold circuit is also within the scope of the inventive concept disclosed herein, in which case the factors (k) could assume a plurality of values, for example, 1/16, $\frac{1}{4}$, $\frac{1}{2}$ and 1, so that even finer adaptation can be obtained and no potentially disturbing transitions will occur.

Because no variable information from the contrast agent is obtained until roll-in of the data into the first image memory 15, control of the multiplication stages 11 and 17 could be omitted. The factors of the multiplication stages 11 and 17 may be set at fixed value, so that the blank image is integrated with a large time constant over its entire region.

A further embodiment of the invention is shown in FIG. 3 additionally including a switch 23 connected between the mass memory 10 and the multiplication stages 11 and 12, for connecting the inputs of the stages 11 and 12 either directly to the output of the storage stage 6, or through a filter stage 24. The filter stage 24 may be a spatial frequency filter. In the embodiment shown in FIG. 3, the filter stage 24 consists of a low-pass filter 25 and a high-pass filter 26 each having inputs connected to the output of the mass memory 10. The outputs of the filter 25 and 26 are connected to an adder stage 27, having an output connected to one contact of the switch 23. The memory 21 is direcly connected to the high-pass filter 26, and turns that filter on as a function of the signal stored in the memory 21.

In the embodiment shown in FIG. 3, a blank image is entered in the first image memory 15 as described above and the path of the contrast agent is integrated in the second image memory 16. Changes in the subtraction image caused by the presence of the contrast agent in the vessels are acquired by the threshold circuit 20 and are entered into memory 21 picture element-by-picture element. Subsequently the contents of the mass memory 10 are again read out, this time the switch 23 connecting the output of the adder stage 27 to the inputs of the multiplication stages 11 and 12. The high-pass filter 26 is switched synchronously with the video signal from the mass memory 10 picture element-by-picture element as a function of the signal stored in the memory 21. As a result the low-pass filter 25 will be effective only in the regions of the overall image outside of the vessels for reducing noise, whereas no filter effect occurs within the vessels for which the filters 25 and 26 operate in parallel and whose output signals are superimposed in the adder stage 27, so that the video signal passes through the filter stage 24 unimpeded.

Figure 4:
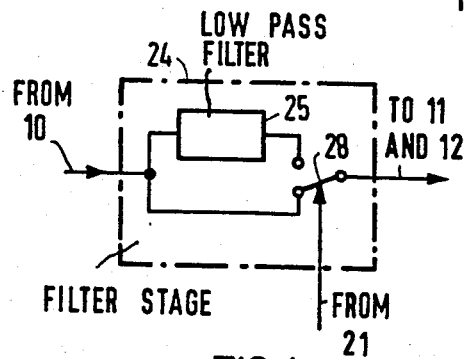
FIG. 4 is a block diagram of a further embodiment of the filter shown in FIG. 3.

A further embodiment of the filter stage 24 is shown in FIG. 4, wherein a further switch 28 is provided, controlled by the output of the memory 21, for directly connecting the output of the mass memory 10 to the multiplication stages 11 and 12, or for connecting the output of the mass memory 10 to the multiplication stages 11 and 12 through the low-pass filter 25. The memory 21 controls the position of the switch 28 so that the video signal is low-pass filtered in the region outside of the vessels and is through-connected within the vessels. In this embodiment the switch 23 shown in FIG. 3 is not needed.

Figure 5:
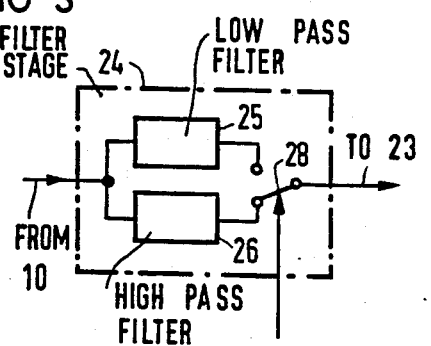
FIG. 5 is a block diagram of another embodiment of the filter shown in FIG. 3.

Another embodiment for the filter stage 24 is shown in FIG. 5 wherein a low-pass filter 25 and a high-pass filter 26 are again connected to the output of the mass memory 10 in parallel. In this embodiment the switch 28, again controlled by the output of the memory 21, causes the output of the filter stage 24 supplied to the switch 23 to be either high-pass filtered or low-pass filtered, so that noise is still reduced outside of the vessels, whereas a homogenization of the signal occurs within the vessels, so that consist changes in the image are emphasized.

Instead of being connected to the output of the mass memory 10, the filter stage 24 may also be connected to the difference forming stage 19, so that the output signal of the filter stage 24 is displayed on the monitor 8. As already described, processing can also be undertaken in a real-time mode. The embodiment of FIG. 3 can also be utilized for real-time processing if the switch 23 is omitted so that the output of the filter stage 24 is always connected between the mass memory 10 and the multiplication stages 11 and 12.

The embodiments of the subtraction stages shown in FIGS. 2 and 3 may also be combined so that a chronological and frequency filtering of the signals takes place simultaneously, controlled by the output signal of the memory 21. In such a combination, electronic noise and quantum noise are further substantially reduced in the image regions outside of the vessels. The recursive filters may be omitted, in which case the noise will be somewhat increased.

Although modifications and changes may be suggested by those skilled in the art it is the intention of the inventors to embody within the patent warranted hereon all changes and modifications as reasonably and properly come within the scope of their contribution to the art.

We claim as our invention:

1. In an x-ray diagnostic installation having means for generating x-rays and admitting said x-rays directed at an examination subject, an x-ray intensifier for receiving x-rays transmitted through said examination subject and for converting the transmitted x-rays into a visible image, and a video display chain including a video camera for viewing the visible image and for generating a video signal therefrom, a subtraction stage connected to the video camera, said subtraction stage forming an output signal, and a monitor connected to the subtraction stage for visually displaying a monitor image from said output signal, said monitor image consisting of a plurality of picture elements, the improvement wherein said subtraction stage comprises:

image memory means for storing a current video signal and a past video signal and a past video signal;

a weighting circuit containing said image memory means for weighting said current and past video signals with controllable parameters;

a difference forming unit, to subtract said weighted current and past video signals, which is connected to an output of said image memory means and having an output connected to said monitor;

a threshold circuit having an input also connected to the output of said difference forming unit;

a further memory means having a data input connected to the output of said threshold circuit such that only data above the threshold of said threshold circuit are entered in said further memory means, said data being entered therein picture element-by-picture element; and means connected between an output of said further memory means and said weighting circuit for controlling said controllable weighting parameters of said weighting circuit picture element-by-picture element for selected periods during operation of said installation.

2. An x-ray diagnostic installation as claimed in claim 1, wherein said weighting circuit is a chronological low-pass filter for filtering in the time domain and wherein said means for controlling the weighting parameters of said weighting circuit is a control line connected to said low-pass filter for controlling the time constants thereof.

3. In an x-ray diagnostic installation having means for generating x-rays and admitting said x-rays directed at an examination subject, an x-ray intensifier for receiving x-rays transmitted through said examination subject and for converting the transmitted x-rays into a visible image, and a video display chain including a video camera for viewing the visible image and for generating a video signal therefrom, a subtraction stage connected to the video camera, said subtraction stage forming an output signal, and a monitor connected to the subtraction stage for visually displaying a monitor image from said output signal, said monitor image consisting of a plurality of picture elements, the improvement wherein said subtraction stage comprises:

image memory means for storing a current video signal and a past video signal and a past video signal;

a weighting circuit containing said image memory means for weighting said current and past video signals with selected parameters;

a difference forming unit, to subtract said weighted current and past video signals, which is connected to an output of said image memory means and having an output connected to said monitor;

a threshold circuit having an input also connected to the output of said difference forming unit;

a further memory means having a data input connected to the output of said threshold circuit such that only data above the threshold of said threshold circuit are entered in said further memory means, said date being entered therein picture element-by-picture element; and a spatial frequency filter connected between the output of said video camera and said weighting circuit wherein the output of said further memory means controls the filter characteristic of said spatial frequency filter.

4. An x-ray diagnostic installation as claimed in claim 3, wherein said spatial frequency filter comprises first and second branches connected between the output of said video camera and said weighting circuit and a switch controlled by the output of said further memory means for selectively connecting the output of said video camera to said weighting circuit through one of said first or second branches, said first branch including a low-pass filter.

5. An x-ray diagnostic installation as claimed in claim 4, wherein said second branch includes a high-pass filter.

6. An x-ray diagnostic installation as claimed in claim 4, wherein said second branch is a direct connection from said video camera to said switch.

7. An x-ray diagnostic installation as claimed in claim 3, wherein said spatial filter comprises a low-pass filter and a high-pass filter each having inputs connected to the output of said video camera and an adder having inputs connected to the outputs of said low-pass filter and said high-pass filter, and wherein said installation further comprises a switch for selectively directly connecting the output of said video camera to said weighting circuit or connecting the output of said video camera to said weighting circuit through said spatial filter.

8. An x-ray diagnostic installation as claimed in claim 1, wherein said weighting circuit with image memory means comprises first and second branches each connected between the output of said video camera and an input of said difference forming unit, each branch having a first multiplication stage, an adder stage having one input connected to the output of said first multiplication stage, an image memory having a data input connected to the output of said adder stage and having an output connected to another input of said adder stage through a second multiplication stage; said means controlling said multiplication stages in said first and second branches.

9. A method for operating an x-ray diagnostic installation for obtaining a visual image of an examination subject, said image comprising a plurality of picture elements, said installation including a means for converting x-radiation from said examination subject into a video signal, said method comprising the steps of:

storing a current video signal and a past video signal;
 supplying the said current and past video signals to two separate branches, where said current and past video signals are weighting parameters;
 forming a difference signal between said weighted current video signal and said weighted past video signal;
 supplying said difference signal to a monitor for viewing said image;
 injecting said examination subject with a contrast agent;
 entering and storing said difference signal picture element-by-picture element in a memory through a threshold circuit such that only data are entered in said memory which exceed the threshold of said threshold circuit; and
 controlling the weighting parameters based on the contents of said memory picture element-by-picture element for highlighting regions of said image containing said contrast agent.

* * * * *